United States Patent

[11] 3,580,678

[72] Inventor Terrance S. Roman
 Latrobe, Pa.
[21] Appl. No. 784,647
[22] Filed Dec. 18, 1968
[45] Patented May 25, 1971
[73] Assignee Cross Electronics, Inc.
 Wexford, Pa.

[54] OPTICAL PYROMETERS
 14 Claims, 11 Drawing Figs.
[52] U.S. Cl. .................................................... 356/43
[51] Int. Cl. ..................................................... G01j 5/48
[50] Field of Search ........................................... 356/43, 219

[56] References Cited
 UNITED STATES PATENTS
2,798,961 7/1957 Wormser ...................... 356/43
3,269,255 8/1966 Shaw ............................ 356/43
3,405,269 10/1968 Wood ........................... 356/43

FOREIGN PATENTS
696,816 10/1964 Canada ....................... 356/219

Primary Examiner—Ronald L. Wibert
Assistant Examiner—Conrad Clark
Attorney—Don J. Smith ABSTRACT: I disclose, in an optical pyrometer system, the combination comprising an optical system for receiving and focusing incident radiation from an object, a beam splitter disposed in a light path of said optical system, for passing a portion of said incident radiation to a direct viewing aperture of said optical system and the remainder of said incident radiation to a second aperture of said optical system, light sensitive detecting means juxtaposed to said second aperture for receiving incident radiation passing therethrough, and said direct viewing aperture and said second aperture being sized so that the light sensitive area of said detecting means is completely covered by said second aperture radiation when an object image focused by said optical system completely fills said direct viewing aperture.

PATENTED MAY 25 1971
3,580,678
SHEET 1 OF 2
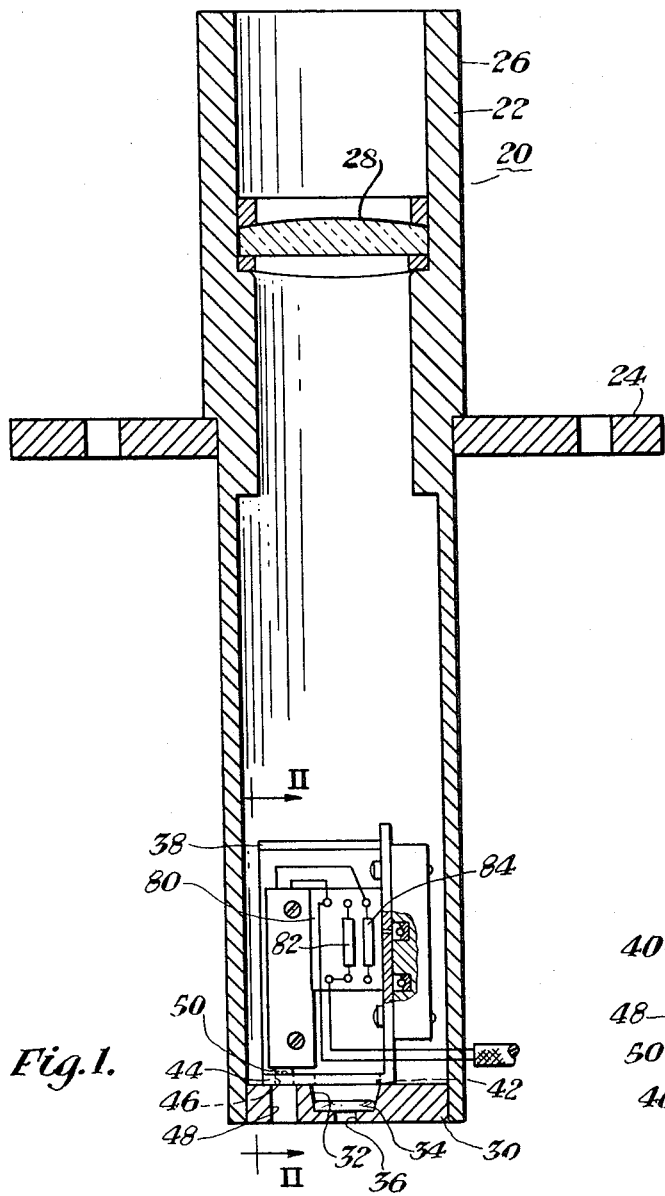
Fig.1.
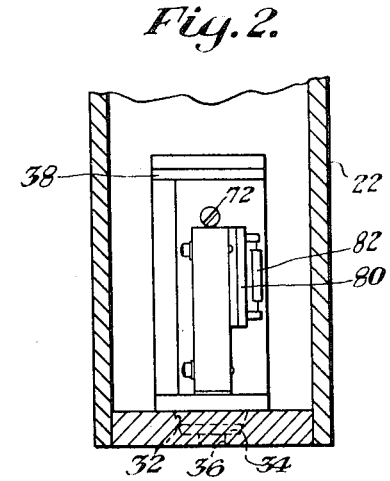
Fig.2.
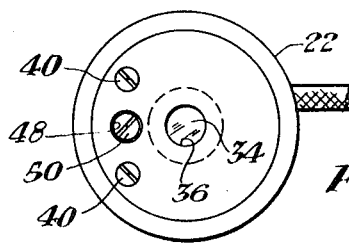
Fig.3.
Fig.1A.
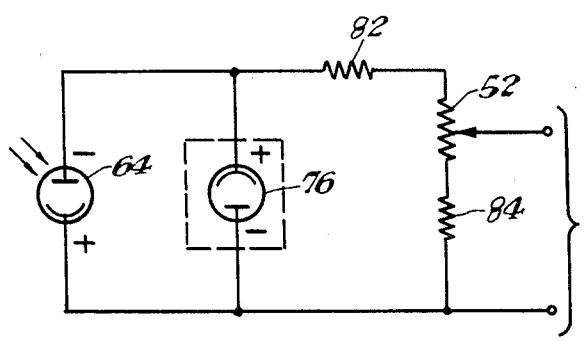
Fig.4A.
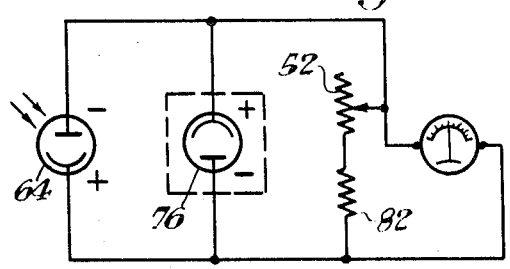
Fig.4B.
INVENTOR
Terrance S. Roman.
BY
HIS ATTORNEYS INVENTOR
Terrance S. Roman.

OPTICAL PYROMETERS

The present invention relates to optical pyrometers and more particularly to viewing, aiming and transducing arrangements suitable for use in single and dual wave length pyrometers.

Numerous forms of optical pyrometers have been proposed through the years and many of these have been more or less successful in applications for which they have been designed. In their simpliest or basic form, optical pyrometers are sensitive to a single range of wave lengths and are commonly referred to as single wave length pyrometers. Batteries or external power supplies have been required for many single wave length pyrometers and add to the size and complexity of the equipment. Optical pyrometers of this type, while suitable for many applications, have been incapable of precise temperature measurements or of extended operating ranges. This follows in general from lack of sensitivity and the tendency of the electrical and emissivity characteristics of the transducer to change with ambient conditions. In single wave length pyrometers no adequate means have been proposed for cancelling these emissivities and optic interference effects to which the photocell or similar transducer is particularly subject.

More advanced optical pyrometers measure temperature as a function of radiant energy dependent signals emitted from a pair of light sensitive transducers exposed to different ranges of wave length. These pyrometers are referred to as dual wave length pyrometers and the energy level of the heated object is compared at two wave lengths. Thus, in the past some of the aforementioned ambient, emissivity, and optical interference effects can be cancelled out. However, in many known forms of dual wave length pyrometers, the comparison of the two wave lengths has been carried out with mechanical choppers, shutters or reference lamps, any one of which leads to complexity in construction and difficulty in operation. Other forms of dual wave length pyrometers required manual balancing or other manual comparison of the dual wave length detection systems. In any event prior wave length pyrometers have been subject to spurious signal or readings and to unnecessarily limited operating ranges.

In general, both single and dual wave length pyrometers have been deficient in sensitivity, have required dynamic components or have been incapable of developing an output signal suitable for recording for process control purposes. Known dual and single wave length pyrometers have been difficult to calibrate and to compensate for various emissivity effects. Known forms of both single and dual wave length pyrometers have been difficult to orientate accurately with a remote object such that the radiation of the object falls properly and repetitively upon the optical and detecting systems of the pyrometer.

I overcome these defects of the prior art by providing, in either a single or dual wave length optical pyrometer, means for extending the effective operating ranges of both dual and single wave length pyrometers, for cancelling or otherwise compensating emissivity and temperature and other ambient effects, and for calibrating and visually sighting the pyrometer. Radiation measurements with my novel pyrometers are accomplished automatically without manual balancing or manual comparisons and without dynamic components of any kind. While utilizing solid state devices, my radiation pyrometers provide output suitable for recording and process control. Equally noteworthy are the ease of handling and low maintenance requirement of my pyrometer systems.

The optical pyrometers of the present invention each include a unique optical system and detecting or signal generating systems. The optical system of either the single or dual wave length pyrometer allows an observer to orientate accurately the pyrometer with a remote object, facilitates focusing the heat radiation of the object upon the detecting elements of the pyrometer, indicates to the user whether the amount of heat radiation reaching the detecting elements is of proper target size (a prerequisite for the pyrometer systems disclosed herein), and selects the type or wave length range of heat radiation reaching the detecting elements.

In the case of the single wave length pyrometer, I provide a detecting and signal generating system which requires no batteries or external power supply. I also provide a unique arrangement of radiation detecting means which is self-compensating as to emissivity and ambient effects. The electrical output of the single wave length pyrometer is readily calibrated in terms of temperature and can be used for recording or control function.

In the detecting circuit of my dual wave length pyrometer the energy level of the heated object is compared at two wave lengths on a continuous basis with a predetermined reference level contained within the detecting circuit. The energies from the heated object are focused onto photoconductive devices sensitive to the wave lengths employed. The photoconductive devices are shunted across a magnetic bridge or the like and their outputs are converted and amplified to a differential electrical signal which can be converted to a temperature reading or utilized for control functions or meter indications. The detection system of the dual wave length pyrometer is also self-compensating as to emissivity, ambient and other effects. The comparison of the two wave lengths is carried out continuously and without the use of mechanical choppers, shutters or reference lamps.

I accomplish these desirable results by providing in an optical pyrometer system, the combination comprising an optical system, for receiving and focusing incident radiation from an object, a beam splitter disposed in a light path of said optical system for passing a portion of said incident radiation to a direct viewing aperture of said optical system and the remainder of said incident radiation to a second aperture of said optical system, light sensitive detecting means juxtaposed to said second aperture for receiving incident radiation passing therethrough, and said direct viewing aperture and said second aperture being sized so that the light sensitive area of said detecting means is completely covered by said second aperture radiation when an object image focused by said optical system completely fills said direct viewing aperture.

I also desirably provide a similar pyrometer system wherein said optical system includes objective and viewing lens having a common optical axis and direct viewing path therebetween, and said beam splitter includes partial reflecting means disposed in said direct viewing path, said partial reflecting means being capable of transmitting a minor portion of said incident radiation to said direct viewing aperture and of reflecting a major portion of said radiation to said second aperture along a path in an angle to said axis.

I also desirably provide a similar pyrometer system wherein a heat sink is provided for said light detecting means, said light detecting means are mounted on said block in good heat transfer relation therewith, additional light sensitive means are similarly mounted on said block at a position removed from said aperture so to be "dark" with respect to radiation, and circuit means are provided for connecting the first-mentioned and said additional light sensitive means in electrical bucking relation to external temperature indicating means for cancellation of ambient effects and the like.

I also desirably provide a similar pyrometer system wherein a second beam splitter is juxtaposed to said second aperture for splitting radiation passing through said second aperture into light paths of substantially equal energy levels, and a light sensitive detection means is interposed in each of said paths, said detectors being sensitive to differing wave lengths of said radiation.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 1 is a longitudinally sectioned view of one form of single wave length optical pyrometer system arranged in accordance with the present invention;

FIG. 1A is an end elevational view of the apparatus as shown in FIG. 1;

FIG. 2 is a partial longitudinally sectioned view of the apparatus of FIG. 1 and taken along reference line II–II thereof;

FIG. 3 is an enlarged view of certain of the optical and electrical components shown in the preceding figures with parts being removed for purposes of illustrating the invention;

FIGS. 4A and 4B are alternative circuit schematics of the electrical system of the pyrometer system in the preceding figures;

Figures 5, 6, 7, 8:
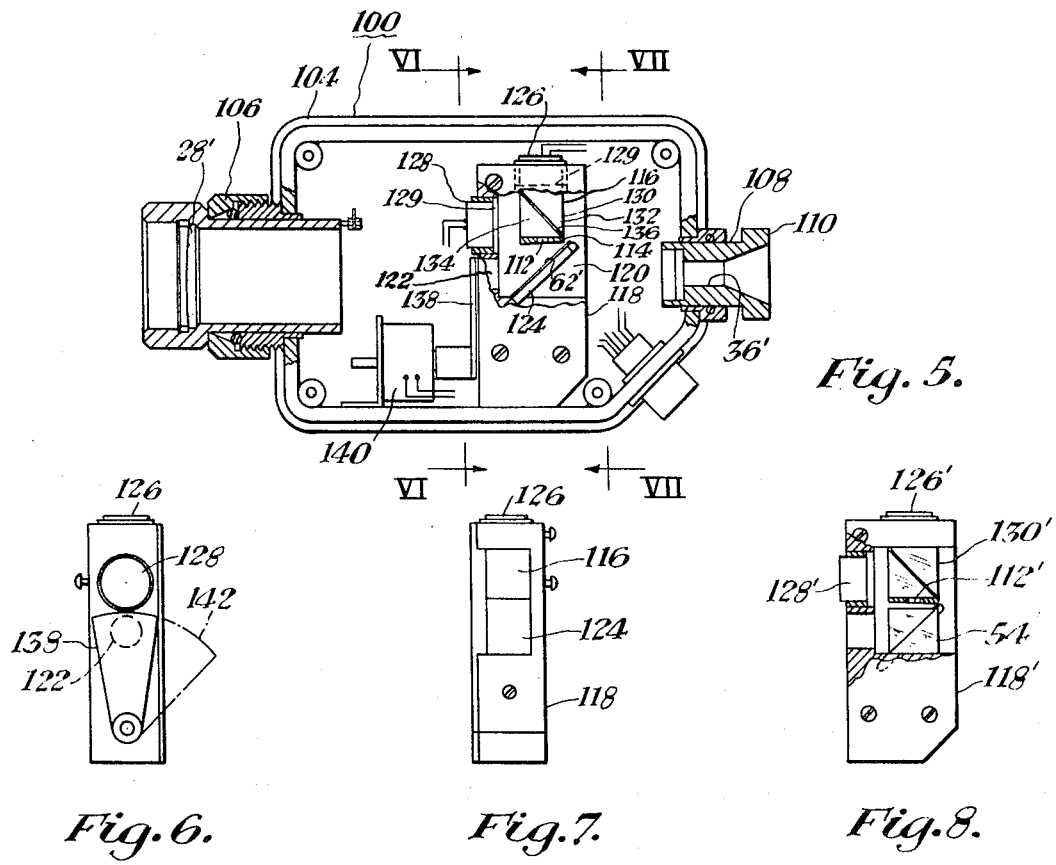
FIG. 5 is a longitudinally sectioned view of one form of dual wave length optical pyrometer system arranged in accordance with the invention and having certain novel optical features in common with the pyrometer of FIG. 1.
FIG. 6 is a cross-sectional view of the apparatus as shown in FIG. 5 and taken along reference line VI–VI thereof.
FIG. 7 is another cross-sectional view of the apparatus as shown in FIG. 5 and taken along reference line VII–VII thereof.
FIG. 8 is an alternative arrangement of the beam splitter and photocell assembly shown in FIG. 5.

Referring now more particularly to FIGS. 1–3 of the drawings, the exemplary form of my invention shown therein is a single wave length optical pyrometer 20 having in this example a general tubular housing 22. An accessory mounting plate 24 can be secured to the housing 22 adjacent its enlarged outer section 26 in which is mounted objective lens 28. At the other end of the housing 20 a rear mounting plate 30 is threaded or otherwise secured to the housing 22 and contains a recess 32 in which is mounted a viewing lens 34. The outer extremity of the recess 32 is restricted as denoted by reference numeral 36 to provide an aiming aperture for purposes described below.

A mounting bracket 38 is secured to the inner surface of the end plate 30 by means of screws 40 (FIG. 1A). The mounting bracket is provided with an aperture 42 in its base plate 44 which is aligned with the viewing lens recess 32 as better shown in FIGS. 1 and 2. The base plate 44 of the mounting bracket 38 contains a second aperture 46 (FIGS. 1 and 3) which is aligned with a similarly sized aperture 48 in the end plate 30. The aligned apertures 46, 48 accommodate the insertion of a screwdriver or the like for turning adjustment screw 50 of potentiometer 52 (FIGS. 3, 4A and 4B) as described below.

The potentiometer 52 together with beam splitter 54 are mounted on the mounting bracket 38 as better shown in FIG. 3. The beam splitter block 54 is disposed directly in the optical path between the objective and viewing lens 28, 34. A filter plate 56, likewise mounted on the mounting bracket 38 is extended across the light path between the objective lens 28 and the beam splitter 54.

The filter plate 56 is of neutral density such that the radiation passing through the objective lens 28 is focused upon the beam splitter 54. In this example the beam splitter includes a pair of prisms 58, 60 which enclose therebetween a partially reflective coating 62 upon which an image of the heated object (not shown) is focused. The beam splitter thus described is available under the designation IR–81E from Liberty Mirror of Pittsburgh, Pennsylvania. The coating 62 reflects radiation in the range of 5800 A. and above and is transparent to radiation below 5800 A. The beam splitter coating 62 therefore reflects about 90 percent of the incident radiation to detector 64 through aperture 66 in aperture plate 68. The remaining 10 percent of the incident radiation is passed through the viewing lens 34 and aiming aperture 36 to the user of the pyrometer 20.

In this example the aperture plate 68 forms part of the mounting bracket 38 as better shown in FIGS. 3 of the drawings. The photocell 64 which is juxtaposed to the photocell aperture 66 is embedded in a heat sink or block 70 fabricated from a good heat conductive material such as aluminum. The heat sink 70 is secured as by mounting screws 72 to the aperture plate 68. The beam splitter 54 is secured to the mounting bracket 38 by a suitable adhesive such as contact cement or epoxy glue.

The photocell 64 is retained in recess 72 of the block 70 where it is partially embedded in a mass of patching putty or potting compound 74 to ensure a high heat transfer coefficient between the beam splitter 54 and heat sink or block 70.

A second photocell 76, preferably identical in construction to the photocell 64 is similarly mounted in a second heat sink recess 78. The second photocell however is "blind" and its recess 78 is completely covered by the aperture plate 68 so that no incident radiation falls upon the blind or dark photocell 76. However, as better shown in FIGS. 4A and 4B the photocells 64, 76 are coupled in electrical bucking relation such that random emissivity, temperature effects and other ambient effects are completely cancelled. By virtue of their similar mounting in the heat sink 70, the photocells 64, 76 are exposed to precisely identical ambient conditions. Thus, the signal emitted from the bucking photocells 64, 68 it totally proportional to incident radiation and all spurious signals are electrically cancelled.

The respective distances between the components of the optical system and particularly the distances between the beam splitter coating 62 and the aiming aperture 36 are selected to indicate a proper aiming of the pyrometer 20 for maximum sensitivity. Thus, when the projected image of the heated object is of a size to at least completely fill the aiming or viewing aperture 36, the size of the image focused on the beam splitter coating 62 is likewise of a size to fill completely the aperture 66 as "seen" by the photocell 64. This denotes a proper alignment or aiming of the optical pyrometer 20 as the sensitive areas of the photocell 64 at the time are completely covered by reflected radiation from the object. Obviously, the image observed by the user can be larger than the aiming aperture 36 as the radiation reaching the photocell 64 is limited by the size of the aperture 66. However, if the viewed image is smaller than the aiming aperture 36, then the sensitive areas of the photocell 64 are not completely covered by reflected radiation passing through the photocell aperture 66, and a spurious temperature reading is obtained.

In FIGS. 4A and 4B typical recording and metering circuits are respectively illustrated. For convenience, certain elements of the circuits are mounted on or connected to thermal board 80 which can be adhered to the beam splitter 54, as better shown in FIG. 2, by means of contact cement or epoxy glue. From either FIG. 4A or 4B it will be seen that the active photocell 64 and the dark or blind photocell 76 are coupled in electrical bucking relation. A signal is developed across resistor 82 and potentiometer 52, with the latter being adjusted for calibration purposes. In the circuit of FIG. 4A a matching resistance 84 is added.

Referring now to FIGS. 5–7 of the drawings, a somewhat similar optical system is employed in my novel dual wave length pyrometer 100 together with a unique electrical system forming part of the pyrometer system. In this arrangement the optical and electrical components of the pyrometer 100, with the exception of an external power supply denoted generally at 102 (FIG. 9) are likewise contained within casing 104. At the front end of the casing 104 an objective lens assembly denoted generally by reference character 106 is mounted. At the opposite end of the casing 104 is a viewing lens assembly 108 secured in alignment with the objective lens assembly 106. The viewing assembly 108 includes an eyepiece and sight tube 110 having a constricted passage 36' which is sized in the manner explained in connection with the aperture 36 of FIGS. 1, 1A and 2. Thus, when the pyrometer 100 is aimed properly for maximum photocell exposure, the object viewed through the eyepiece 110 at least completely fills the constricted passage 36'. As explained in greater detail below this condition is related to the size of aperture 112 in aperture plate 114 mounted adjacent the dual wave length splitter 116.

Mounted generally between the objective and viewing lens systems 106, 108 is a photocell and beam splitter assembly denoted generally by the reference numeral 118. As better shown in FIG. 5 and 6 these components are contained within a housing 120 provided at its front surface with an entrance aperture 122, which is aligned with the optical axes of the objective and viewing lens system 106, 108. Thus, focused radiation from the objective lens 28' passes through aperture 122 and in this arrangement is focused upon a beam splitting mirror 124. The mirror 124 is provided with a partially reflective coating 62' which is similar to the coating 62 described in connection with FIG. 3 of the drawings. Thus, 10 percent of the radiation (below 5800 A.) passes through the partial mirror 124 for direct viewing by the user through eyepiece 110. The remaining 90 percent of the incident radiation (about 5800 A.) is reflected to the aforementioned aperture plate 114 wherein the aperture 112 thereof is sized such that the incident radiation passing through the aperture plate 114 completely covers the light sensitive areas of the photocells 126, 128 described below. Thus, the apertures 36', 112 serve a similar aiming function for the dual wave length pyrometer 100 as the apertures 36 and 66 of FIGS. 1—3.

After the incident radiation which is focused upon the mirror splitter 124 passes through the aperture plate 114 the dual wave length imaging characteristic of the pyrometer 100 is initiated at a second beam splitter 130. The beam splitter 130 is a 50-50 device which separates the incident radiation passing through apertures 112.

For this purpose the beam splitter 130 includes a pair of prisms 132, 134 and a partially reflective coating 136 therebetween and is available from Edmond Scientific Co., Burlington, New Jersey. The coating 136 has the property of reflecting 50 percent of the reflected radiant energy (from mirror 124) to the sensitive areas of photocell 128 and passing the remaining 50 percent of the radiant energy to photocell 126.

With this arrangement portions of the impinging radiation are focused continuously and respectively on the separate detectors 126, 128. The outputs of these detectors are shunted across the bridge circuit of FIG. 9 to produce an amplified and highly accurate differential electric signal which can be converted into a temperature reading or which can be supplied to external control equipment.

In FIG. 8 of the drawings, a similar photocell and beam splitter assembly 118' is disclosed. In the latter arrangement of the invention the beam splitting mirror 154 (FIG. 5) is replaced by a 90-10 prismatic beam splitter 54' similar to that utilized in the single wave length pyrometer 20 (FIGS. 1—3). By the same token, the prismatic beam splitter 54 of FIGS. 1-—3 can be replaced with a beam splitting mirror such as the mirror 124 of FIG. 5.

For calibration purposes (FIGS. 5 and 6 of the drawings) a movable shutter 138 is provided for the entrance housing aperture 122. The shutter 138 is moved by solenoid 140 between its solid outline position in FIG. 6 and a retracted position as denoted by chain outline 142. At its solid outline position the shutter 138 prevents the transfer of any random radiation to the photocells 126, 128 when the latter are calibrated as described in connection with FIG. 9.

Figure 9:
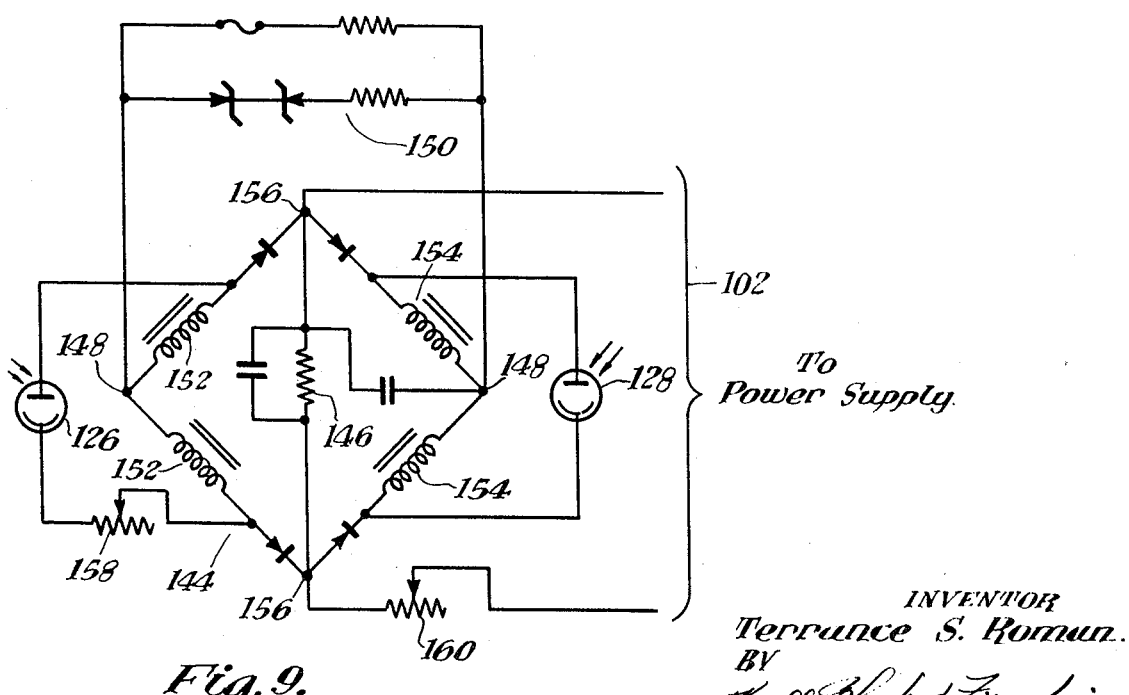
FIG. 9 is a schematic circuit diagram of one from of detecting circuit for use with the dual wave length pyrometer systems of FIGS. 5–8.

In FIG. 9 of the drawings a magnetic bridge circuit 144 is illustrated for developing a useful signal across output resistance 146 from the radiation-related outputs of photocells 126, 128 respectively. The supply terminals 148 of the bridge are connected in this example to a regulated AC supply denoted generally by reference character 150. The bridge 144 differentiates and amplifies the electrical outputs of the photocells 126, 128 which are shunted respectively across matched inductances 152, 154. A meter or control signal thus is developed across bridge output terminals 156.

For calibration purposes potentiometers 158, 160 are coupled in series with one of the photocells, for example photocell 126, and in the output circuit of the bridge 144. By covering aperture 122 (FIG. 6) with the shutter 138, the photocells 126, 128 can be matched with one another and with the metering or recording circuitry by adjustment of one or both of the potentiometers 158, 160.

From the foregoing it will be apparent that novel and efficient forms of optical pyrometers have been described herein. While I have shown and described certain presently preferred embodiments of the invention and have illustrated certain presently preferred methods of practicing the same, it is to be distinctly understood that the invention is not limited thereto but may be otherwise variously embodied and practiced within the scope of the following claims.

I claim:

1. In an optical pyrometer system, the combination comprising an optical system for receiving and focusing incident radiation from an object, a beam splitter including a primarily reflective light-transmitting member disposed in a light path of said optical system for passing a minor portion of said incident radiation to a direct viewing aperture of said optical system and remainder of said incident radiation to a second aperture of said optical system, light sensitive detecting means juxtaposed to said second aperture for receiving incident radiation passing therethrough, and said direct viewing aperture and said second aperture being shaped so that the light sensitive area of said detecting means is completely covered by said second aperture radiation when an object image focused by said optical system completely fills said direct viewing aperture.

2. The combination according to claim 1 wherein said optical system includes objective and viewing lens having a common optical axis and direct-viewing path therebetween, and said beam splitter member is disposed in said direct-viewing path, said member being capable of transmitting said minor portion directly to said direct viewing aperture and of reflecting said remainder to said second aperture along a path in an angle to said axis.

3. The combination according to claim 2 wherein said beam splitter includes a pair of substantially transparent prisms enclosing a primarily reflecting means therebetween.

4. The combination according to claim 2 wherein said beam splitter is a substantially transparent plate having a primarily reflecting coating thereon.

5. The combination according to claim 1 wherein a heat sink is provided for said light detecting means, said light detecting means are mounted on said heat sink in good heat transfer relation therewith, additional light sensitive means are similarly mounted on said heat sink at a position removed from said aperture so to be "dark" with respect to radiation, and circuit means are provided for connecting the first mentioned and said additional light sensitive means in electrical bucking relation to external temperature indicating means for cancellation of ambient effects and the like.

6. The combination according to claim 1 wherein a second beam splitter is juxtaposed to said second aperture for splitting radiation passing through said second aperture into light paths of substantially equal energy levels, and said detector means include a light sensitive detector interposed in each of said paths, said detectors being sensitive to differing wave lengths of said radiation.

7. The combination according to claim 6 wherein a bridge circuit is provided for differentiating and amplifying the outputs of said light detectors respectively and said outputs are coupled respectively in shunting relation across matched inductances forming part of said bridge.

8. The combination according to claim 7 wherein calibrational circuit means are coupled in series with one of said detector outputs and a movable shutter is provided for aperture means interposed between an objective lens forming part of said optical system and said first-mentioned beam splitter.

9. The combination according to claim 1 wherein said minor portion of the incident radiation is of the order of about 10 percent thereof.

10. In an optical pyrometer system, the combination comprising an optical system for receiving and focusing incident radiation from an object, a beam splitter including a primarily reflective light-transmitting member disposed in a light path of said optical system for passing a minor portion of said incident radiation directly to viewing means of said optical system and the remainder of said incident radiation to light sensitive detecting means for indicating the amount of incident radiation passing thereto.

11. In an optical pyrometer system, the combination comprising an optical system for receiving and focusing incident radiation from an object, means disposed in a light path of said optical system for passing a portion of said incident radiation for direct viewing purposes to first light-transmitting means and the remainder of said incident radiation to second light-transmitting means, light sensitive detecting means juxtaposed to said second light transmitting means for receiving incident radiation passing therethrough, said first and said second light-transmitting means being interrelated such that a light sensitive area of said detecting means is completely covered by said second light-transmitting means radiation when substantially a maximum cross-sectional area of said radiation is passed through said first light-transmitting means.

12. The combination according to claim 10 wherein a second beam splitter is juxtaposed to said detecting means for splitting radiation passing to said detecting means into light paths of substantially equal energy levels, and said detecting means include a light sensitive detector interposed in each of said paths.

13. The combination according to claim 11 wherein a second beam splitter is juxtaposed to said second light transmitting means for splitting radiation passing through said second light transmitting means into light paths of substantially equal energy levels, and said detector means include a light sensitive detector interposed in each of said paths, said detectors being sensitive to differing wave lengths of said radiation.

14. In an optical pyrometer system, the combination comprising an optical system for receiving and focusing incident radiation from an object, a beam splitter disposed in a light path of said optical system for passing a portion of said incident radiation to direct viewing means of said optical system and the remainder of said incident radiation to light sensitive detecting means, a heat sink for said detecting means, said detecting means including a pair of light sensitive detectors similarly mounted in hood heat transfer relation on said heat sink, said detectors being so disposed that one of said detectors is exposed to said radiation remainder while the other of said detector is "dark" with respect to said radiation, and circuit means are provided for connecting said detectors in electrical bucking relation to an external temperature indicating circuit for cancellation of ambient effects and the like.